UNITED STATES PATENT OFFICE.

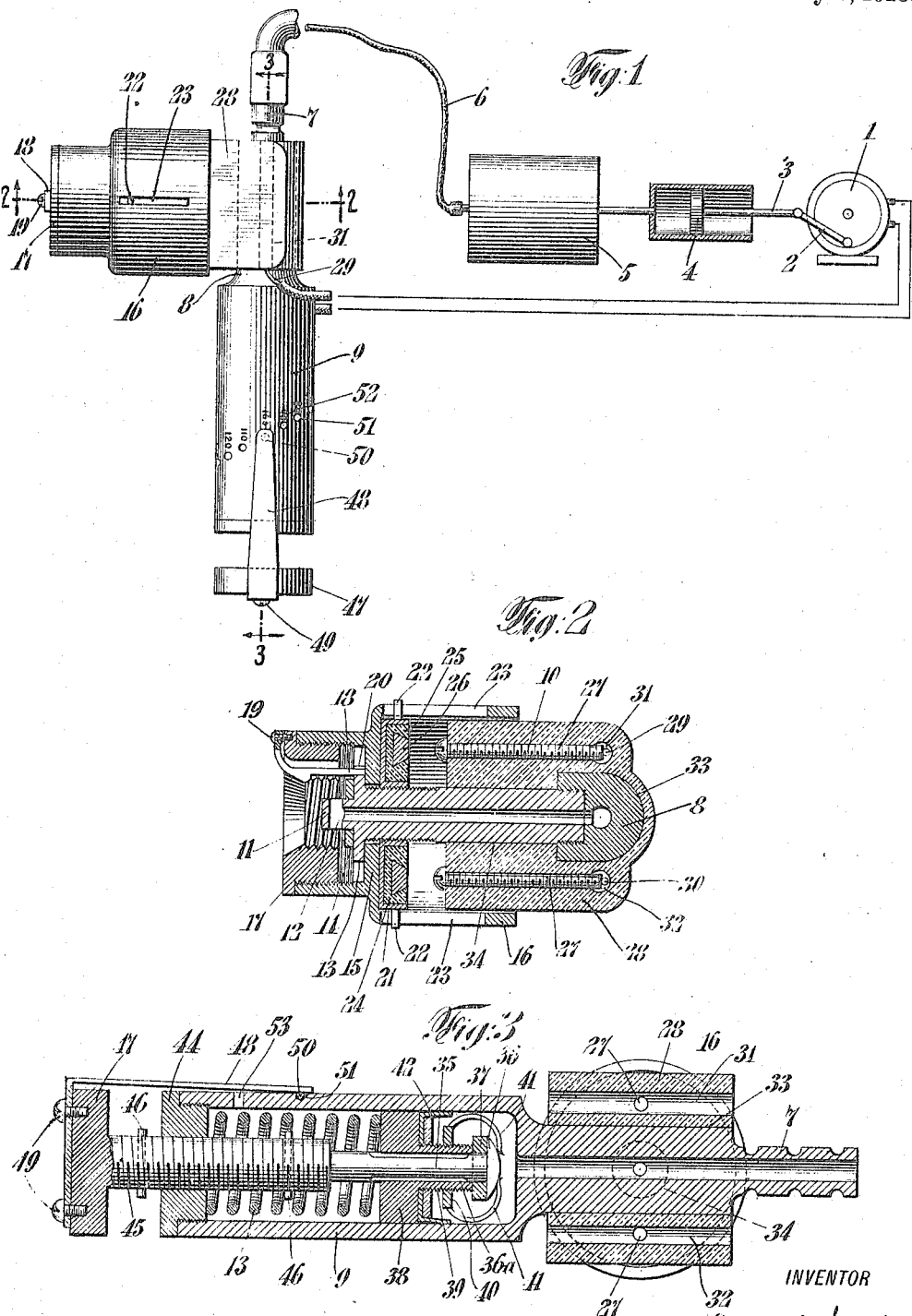

CURLES T. WILLIAMS, OF TRENTON, NEW JERSEY.

TIRE-INFLATION NOZZLE.

1,270,999.

Specification of Letters Patent.  Patented July 2, 1918.

Application filed March 16, 1915.  Serial No. 14,791.

*To all whom it may concern:*

Be it known that I, CURLES T. WILLIAMS, of Trenton, in the county of Mercer, and in the State of New Jersey, have invented a certain new and useful Improvement in Tire-Inflation Nozzles, and do hereby declare that the following is a full, clear, and exact description thereof.

My invention relates particularly to an apparatus designed to be attached to an air line for connection to the nipple of a tire when the same is being inflated.

The object of my invention is to provide an apparatus of this kind, in which there is an electric motor provided for pumping the compressed air, which motor, however, is started automatically by the closing of its circuit only when the apparatus has been applied to the nipple of the tire to be inflated, the parts being locked against the closing of the circuit until the nozzle has been so applied. Another object of my invention is to provide an apparatus of this kind in which the tire cannot be inflated beyond a predetermined pressure, and in which after the predetermined pressure is reached any further air provided by the forcing apparatus is exhausted, the exhaust thus indicating the completion of the inflation of the tire.

While my invention is capable of embodiment in many different forms, for the purpose of illustration I have shown only one form thereof in the accompanying drawings, in which, Figure 1 is a plan view of an apparatus made in accordance with my invention;

Fig. 2 is a detailed section on line 2—2 of Fig. 1 of the portion thereof to be applied to the nozzle of the tire valve; and Fig. 3 is a section of the apparatus taken on line 3—3 of Fig. 1 and showing the pressure regulating device.

In the drawings I have shown an electric motor 1, which is connected by a crank 2 with a piston 3 in an air pump 4. This air pump 4 is arranged to supply an air tank 5 with compressed air. From the air tank 5, a flexible hose 6 leads to a nipple 7. This nipple 7 is connected to a barrel 8, ending in a cylinder 9. Extending from the barrel 8 there is a tube 10, which is screw-threaded into said barrel, and which has a hollow pin 11 extending from its end to open the plunger valve in the tire nipple when the apparatus is applied to the tire to inflate the same. An opening 12 is located in the side of the pin 11 to permit the entry of air from the air supplying means to the tire. On the end of the tube 10 around the pin 11 there is provided an annular abutment 13, which is larger in diameter than the tube 10, the purpose of said abutment being to support on one face thereof a rubber or leather washer 14 and to hold against its other face an inwardly directed flange 15 on a sleeve 16, which is adapted to be rotated by hand to screw the apparatus on and unscrew the apparatus from the tire nipple when the same is to be inflated. Screw-threaded into the end of the sleeve 16 there is an internally and externally screw-threaded head 17, the interior screw-thread of which is provided for screwing the same on to the nipple of the tire when the latter is to be inflated. The interior screw-thread on the head 17 is recessed, however, to receive a spring catch 18 supported by means of a screw 19 upon the bottom of the head 17. The end of this catch 18 is arranged to fall within a notch 20 on the abutment 13 so as to prevent the sleeve 16 from being turned except when the apparatus has been screwed on to the nipple of the tire. The interior screw-thread in the head 17 has a right-handed screw-thread. Upon the exterior of the tube 10 there is a left-handed screw-thread to receive a recessed ring 21 having pins 22 which move in slots 23 in the body of the sleeve 16. This ring 21 carries a porcelain or rubber band 24, which has a dovetailed recess 25 in which there is located a circular contact member 26 made of metal or some other conducting material. This contact member 26 is arranged to complete the circuit between two screws 27, which extend into a block of porcelain or other non-conducting material 28 and hold in place therein two wire terminals 29 and 30 which fit within recesses 31 and 32 provided in the porcelain block 28. A hole 33 passes through the body of the block 28 and a recess 34 is provided upon its under surface so that the block may pass over the barrel 8, and also over the tube 10. Within the cylinder 9 there is arranged a valve 35 having a head 36 and longitudinal passageways 36ª. Around the valve 35 and underneath the head 36 there is a washer 37 made of rubber or leather. Around the valve 35 and beneath the washer 37 there is a piston 38 having a screw-threaded sleeve 39 attached thereto, which is adapted to fit against the washer 37, where it is normally retained in place by a spring ring 40 having arms 41 which extend upwardly and over the top of the head 36, the spring ring 40 being screw-threaded to the sleeve 39. A cup washer 42 made of leather or any other similar material is supported upon the top of the plunger 38 so as to prevent the escape of air around the edges of the plunger 38. Beneath the plunger 38, there is a spring 43 which is retained within the cylinder 9 by a head 44 screw-threaded into the end of the cylinder 9. The head 44 is also screw-threaded internally so as to receive a screw-threaded stop 45 having pins 46 thereon to limit the movement of the same within the head 44. The stop 45 has, furthermore, a flange 47 on its outer end, to which there is connected a spring 48 by means of screws 49, one end of the spring extending along the side of the cylinder 9, and being provided with a projection 50 to register with corresponding recesses 51 in the exterior of the barrel. Opposite each of the recesses 51 there is a member 52 to indicate the number of pounds to which the tire is to be inflated. The cylinder 9 is provided with a vent 53 to permit the escape of the excess air.

In the operation of my invention, when it is desired to inflate a tire, the parts would be in the position as shown in Fig. 2, with the circuit, including the motor 1 broken, as the conducting ring 26 is out of contact with the screws 27. When now the apparatus is applied to the nipple of the tire by screwing the head 17 on to the same, the nipple on the tire forces the catch 18 to one side thereby disengaging the same from the recess 20, so that the sleeve 16 can be rotated until the nipple of the tire becomes seated against the washer 14. Simultaneously, owing to the fact that the screw-thread upon the exterior of the tube 10 is the opposite of that in the interior of the head 17, the ring 21 is gradually moved toward the ends of the screws 27 until the conducting ring 26 completes the circuit between the screws 27, thus causing the motor 1 to operate. The operation of the motor provides compressed air to the air tank 5, which in turn conveys the air by the tube 6 to the nozzle 7 and thence through the barrel 8 and the tube 10 until it reaches the outlet opening 12 from which it passes into the nipple on the tire. The compressed air is thus conveyed by the apparatus into the tire until the desired pressure, determined by the previous adjustment of the stop 45 opposite the desired recess 51 with its corresponding pressure, is attained. Thereafter the increase in pressure will cause the plunger 38 to move downwardly, thereby uncovering the passageways located in the interior of the valve 35, as the part 39 will become unseated from the washer 37. The air will now pass through the passageways in the valve 35 and out from the cylinder 9 through the vent 53. As soon as the air begins to escape from the vent 53, the operator will know that the tire has been entirely inflated and the apparatus is then unscrewed from the tire nipple. As the apparatus is unscrewed from the nipple, the circuit is again broken owing to the travel of the conducting ring 26 along the tube 10 and away from the screws 27, and when the apparatus has been entirely unscrewed from the nipple, the spring catch 18 will enter the recess 20 thereby locking the parts in position and preventing the completion of the motor circuit until the apparatus is again screwed on to a tire nipple.

While I have described my invention above in detail, I wish it to be understood that many changes may be made therein without departing from the spirit of my invention.

I claim:

1. In combination, a device for connecting air supply apparatus to a tire air-inlet valve, a release for excessive pressure comprising an air-releasing device movable with the increase of pressure and a stop coöperating therewith to release the air, a motor-operated air-pump to supply compressed air to the tire and means to start the motor by the application of the device to the tire valve.

2. In combination, a device for connecting air supply apparatus to a tire air-inlet valve, a release for excessive pressure comprising an air-releasing device movable with the increase of pressure, and an adjustable stop coöperating therewith to release the air, a motor-operated air-pump to supply compressed air to the tire and means to start the motor by the application of the device to the tire valve.

3. In combination, a device for connecting air supply apparatus to a tire air-inlet valve, a release for excessive pressure comprising an air-releasing piston and valve movable with the increase of pressure, and a stop coöperating therewith to release the air, a motor-operated air-pump to supply compressed air to the tire and means to start the motor by the application of the device to the tire valve.

4. In combination, a device for connecting air supply apparatus to a tire air-inlet valve, a release for excessive pressure comprising an air-releasing piston and valve movable with the increase of pressure, and an adjustable stop coöperating therewith to release the air, a motor-operated air-pump to supply compressed air to the tire and means to start the motor by the application of the device to the tire valve.

5. In combination, a device for connecting air supply apparatus to a tire air-inlet valve, a release for excessive pressure comprising an air-releasing device movable with the increase of pressure and a stop coöperating therewith to release the air, an electric motor-operated air-pump to supply compressed air to the tire, and means to start the motor by the application of the device to the tire valve comprising a circuit breaker.

6. In combination, a device for connecting air supply apparatus to a tire air-inlet valve, a release for excessive pressure comprising an air-releasing device movable with the increase of pressure, and an adjustable stop coöperating therewith to release the air, an electric motor-operated air-pump to supply compressed air to the tire and means to start the motor by the application of the device to the tire valve comprising a circuit breaker.

7. In combination, a device for connecting air supply apparatus to a tire air-inlet valve, a release for excessive pressure comprising an air-releasing piston and valve movable with the increase of pressure, and a stop coöperating therewith to release the air, an electric motor-operated air-pump to supply compressed air to the tire, and means to start the motor by the application of the device to the tire valve comprising a circuit breaker.

8. In combination, a device for connecting air supply apparatus to a tire air-inlet valve, a release for excessive pressure comprising an air-releasing piston and valve movable with the increase of pressure, and an adjustable stop coöperating therewith to release the air, an electric motor-operated air-pump to supply compressed air to the tire and means to start the motor by the application of the device to the tire valve, comprising a circuit breaker.

9. In combination, a motor-operated air-pump, a device for connecting the same to a tire air-inlet valve, and means operated by the application of the device to the valve to start the motor.

10. In combination, an electric motor-operated air-pump, a device for connecting the same to a tire air-inlet valve, and circuit breaking and making means operated by the application of the device to the valve to start the motor.

11. In combination, a motor-operated air-pump, a device for connecting the same to a tire air-inlet valve, and means operated by the application of the device to the valve to start the motor comprising a rotary sleeve to screw the device onto the air valve.

12. In combination, an electric motor-operated air-pump, a device for connecting the same to a tire air-inlet valve, and circuit breaking and making means operated by the application of the device to the valve to start the motor comprising a rotary sleeve to screw the device onto the air valve.

13. In combination, an electric motor-operated air-pump, a device for connecting the same to a tire air-inlet valve, and circuit breaking and making means operated by the application of the device to the valve to start the motor comprising a rotary sleeve to screw the device into the air valve, and a circuit breaker movable toward its closed position as the sleeve is screwed onto the air valve.

14. In combination, a motor-operated air-pump, a device for connecting the same to a tire air-inlet valve, and means operated by the application of the device to the valve to start the motor comprising a rotary sleeve to screw the device onto the air valve, and an automatic lock for the sleeve when the device is withdrawn from the air valve.

15. In combination, an electric motor-operated air-pump, a device for connecting the same to a tire air-inlet valve, and circuit breaking and making means operated by the application of the device to the valve to start the motor comprising a rotary sleeve to screw the device onto the air valve, and an automatic lock for the sleeve when the device is withdrawn from the air valve.

16. In combination, an electric motor-operated air-pump, a device for connecting the same to a tire air-inlet valve, and circuit breaking and making means operated by the application of the device to the valve to start the motor comprising a rotary sleeve to screw the device onto the air valve, a circuit breaker movable toward its closed position as the sleeve is screwed onto the air valve, and an automatic lock for the sleeve when the device is withdrawn from the air valve.

17. In combination, a motor-operated air-pump, a device for connecting the same to a tire air-inlet valve, and means operated by the application of the device to the valve to start the motor comprising a rotary sleeve to screw the device onto the air valve, and an automatic spring lock for the sleeve when the device is withdrawn from the air valve.

18. In combination, an electric motor-operated air-pump, a device for connecting the same to a tire air-inlet valve, and circuit breaking and making means operated by the application of the device to the valve to start the motor comprising a rotary sleeve to screw the device onto the air valve, and an automatic spring lock for the sleeve when the device is withdrawn from the air valve.

19. In combination, an electric motor-operated air-pump, a device for connecting the same to a tire air-inlet valve, and circuit breaking and making means operated by the application of the device to the valve to start the motor comprising a rotary sleeve to screw the device onto the air valve, a circuit breaker movable toward its closed position as the sleeve is screwed onto the air valve, and an automatic spring lock for the sleeve when the device is withdrawn from the air valve.

20. In combination, an electric motor-operated air-pump, a device for connecting the same to a tire air-inlet valve, and circuit breaking and making means operated by the application of the device to the valve to start the motor comprising a rotary sleeve to screw the device onto the air valve, a circuit breaker movable toward its closed position as the sleeve is screwed onto the air valve, and an insulating circuit terminal block attached to the device and coöperating with the circuit breaker.

21. In combination, an electric motor-operated air-pump, a device for connecting the same to a tire air-inlet valve, and circuit breaking and making means operated by the application of the device to the valve to start the motor comprising a rotary sleeve to screw the device onto the air valve, a circuit breaker movable toward its closed position as the sleeve is screwed onto the air valve, an automatic lock for the sleeve when the device is withdrawn from the air valve, and an insulating circuit terminal block attached to the device and coöperating with the circuit breaker.

22. In combination, an electric motor-operated air-pump, a device for connecting the same to a tire air-inlet valve, and circuit breaking and making means operated by the application of the device to the valve to start the motor comprising a rotary sleeve to screw the device onto the air valve, a circuit breaker movable toward its closed position as the sleeve is screwed onto the air valve, an automatic spring lock for the sleeve when the device is withdrawn from the air valve, and an insulating circuit terminal block attached to the device and coöperating with the circuit breaker.

In testimony that I claim the foregoing I have hereunto set my hand.

CURLES T. WILLIAMS.

Witnesses:
  CHAS. H. ALE,
  J. E. KEMMER.